United States Patent [19]
Watanabe

[11] 3,985,395
[45] Oct. 12, 1976

[54] REMOTE CONTROL BRAKE SYSTEM FOR TRAILERS

[76] Inventor: S. Frank Watanabe, 30420 Lyndon, Livonia, Mich. 48154

[22] Filed: July 23, 1975

[21] Appl. No.: 598,193

[52] U.S. Cl. .................................. 303/7; 188/3 R
[51] Int. Cl.² ...................................... B60T 13/68
[58] Field of Search ............... 188/3 R, 3 H; 303/3, 303/7, 15–17, 40

[56] References Cited
UNITED STATES PATENTS

| | | | |
|---|---|---|---|
| 3,350,142 | 10/1967 | Schuman | 188/3 R X |
| 3,507,542 | 4/1970 | Canella | 303/7 |
| 3,747,992 | 7/1973 | Schnipke | 303/7 X |
| 3,819,238 | 6/1974 | Cermak | 303/7 X |
| 3,836,205 | 9/1974 | Schwerin | 188/3 R X |

*Primary Examiner*—Duane A. Reger
*Attorney, Agent, or Firm*—Charles W. Chandler

[57] ABSTRACT

A tractor trailer system having an actuating member on the tractor electrically connected to a hydraulic braking system on the trailer to provide remote actuation of the brakes. A brake system incorporating an electrically powered, constant hydraulic pressure source located near the brakes to precisely and proportionally control the brake pressure to the brakes by means of a solenoid valve electrically energized by a signal controlled by the movement of an actuator on the tractor cab.

6 Claims, 5 Drawing Figures

REMOTE CONTROL BRAKE SYSTEM FOR TRAILERS

BACKGROUND OF THE INVENTION

This invention is related to braking systems for trailers and more particularly to a brake system remotely actuated by electrical means.

Tractor-trailer braking systems of the prior art usually involve a braking device on a trailer actuated by a fluid connection to an actuating member in the tractor cab. The fluid media is usually air, vacuum or a hydraulic fluid. The problem with such fluid media is a relatively slow response between the actuating member and the brake and conduits requiring coupling and uncoupling such that foreign matter is sometimes introduced into the working fluid.

SUMMARY OF THE INVENTION

One of the broad purposes of the present invention is to provide a braking system for trailers in which the braking device is actuated by an electrical signal from the actuator on the tractor. One advantage of such an arrangement is that the braking device responds in a more precise and responsive manner to the motion of the actuator. Another advantage of such an arrangement is that the electrical connection provides less power loss in actuating the brakes than does a conventional fluid convention.

Still another object of the present invention is to provide a novel solenoid-actuated metering valve for controlling the hydraulic pressure energizing the braking device in a manner proportional to the electrical signal being received from the actuator.

Still further objects and advantages of the present invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
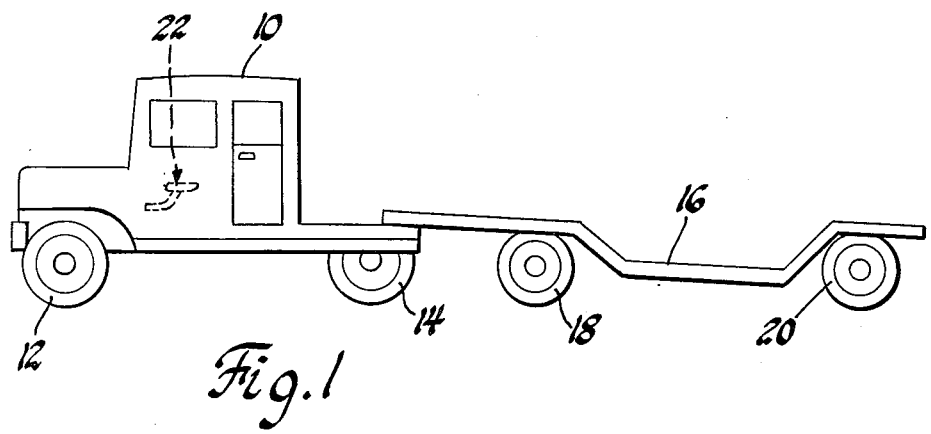
FIG. 1 illustrates a tractor-trailer system incorporating a braking system embodying the invention.
Figure 2:
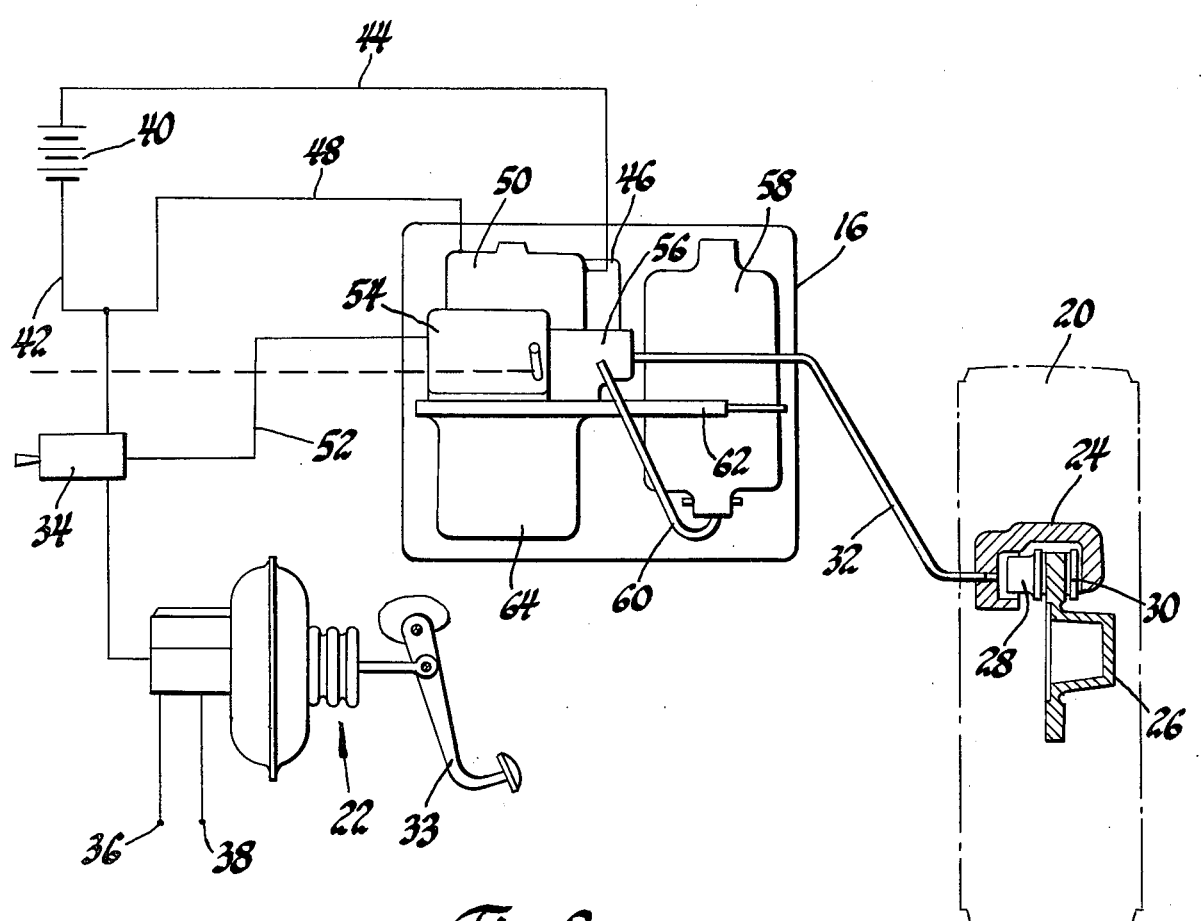
FIG. 2 is a diagrammatic view illustrating the preferred braking system showing the various hydraulic and electrical components.

Referring to FIGS. 1 and 2, a conventional tractor 10 having wheel means 12 and 14, connected to trailer 16 having wheel means 18 and 20. An actuator member 22 is mounted in the cab of tractor 10 for energizing braking means 24 associated with wheel means 20. Braking means 24 includes a conventional disc 26 and a pair of shoes 28 and 30 actuated by a hydraulic connection 32 in the manner well known to those skilled in the art. Actuator 22 is also operated manually by deflecting an actuator pedal 33 to energize connections 36 and 38 connected to the tractor brakes for opening and closing switch 34.

A source of electrical energy 40 is carried by tractor 10 and connected by means 42 to switch 34 and by a connection 44 to a motor control 46. Another connection 48 connects electrical source 40 to an electrical motor 50 which is operatively connected to motor control 46. An electrical connection 52 connects switch 34 to a solenoid 54. The solenoid is operatively engaged to a metering valve means 56. A hydraulic accumulator 58 has a hydraulic connection 60 to valve means 56 for delivering hydraulic pressure to hydraulic connection 32. Solenoid 54, motor 50, motor control 46, valve means 56, and accumulator 58 are mounted on a frame 62 carried by trailer 16. A storage tank 64 provides hydraulic fluid for brake means 24 in a manner which will be described in greater detail.

Figure 3:
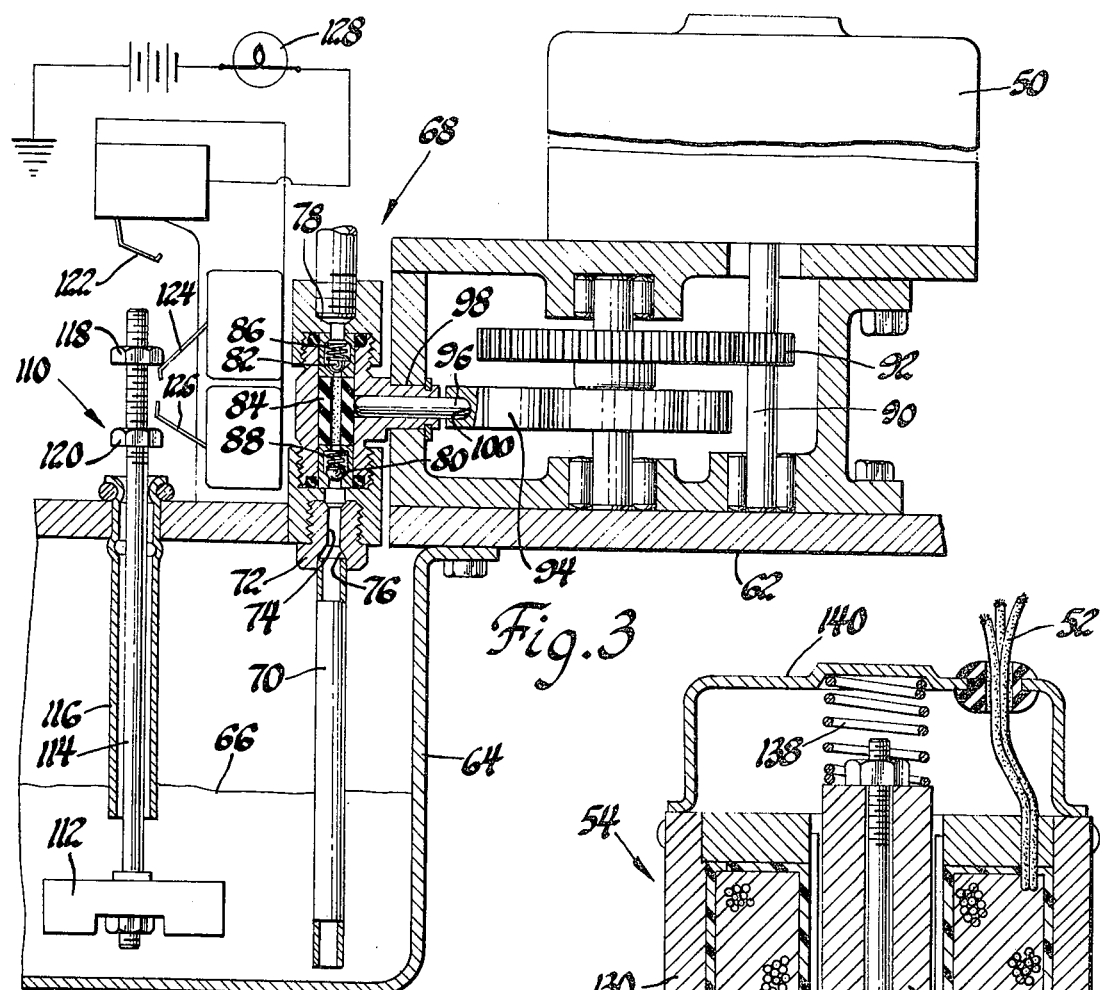
FIG. 3 is a sectional view through the hydraulic pump and the float control.

Now referring to FIG. 3, storage tank 64 has a fluid level 66 which fluctuates in accordance with the demands of the braking system. Pump means 68 provides means for delivering fluid 66 from tank 64 to accumulator 58. Pump means 68 includes an elongated tube 70 having its lower end below the level of fluid 66. Support means 72 carried on frame 62 is connected to the upper end of tube 70. Support means 72 has a fluid passage 74 having an inlet 76 and an outlet 78. A ball valve 80 is mounted adjacent inlet 74 and a second ball valve 82 is mounted adjacent outlet 78. A resilient tube 84 is supported between ball valves 80 and 82. A bias member 86 urges ball valve 82 toward a closed position while a bias member 88 urges ball valve 80 toward a closed position.

Motor 50 has an output shaft 90 rotatably connected to gear means 92 for rotating a cam 94. A piston 96 is reciprocally mounted on gear housing 98 so as to be movable toward and away from resilient tube 84. The reciprocating motion of piston 96 is in accordance with cam surface 100 so that the piston 96 reciprocates in a timed relationship with respect to the rotation of cam 94. Piston 96 is engaged with resilient tube 84 in such a manner as to reduce the diameter of the tube as the piston is moved toward it thereby reducing the internal volume of tube 84. As piston 96 is moved in the opposite direction, it allows the resilient wall of tube 84 to expand toward its cylindrical configuration thereby expanding the volume of the tube.

This alternate contraction and expansion of the internal volume of tube 84 provides a pumping action in the following manner: As the tube interior expands in volume, the pressure within the tube causes valve 80 to open thereby drawing fluid from tank 64 into the tube. At such times as valve 80 is open, valve 82 is closed. As piston 96 moves in the opposite direction to reduce the volume of tube 84, the fluid in the tube causes valve 80 to close and valve 82 to open thereby delivering the fluid toward outlet 78 of fluid passage 74. It is to be understood that this pumping action progressively delivers the fluid through tube 78 toward accumulator 58 which is preferrably a conventional diaphragm actuated device which stores the fluid at a predetermined hydraulic pressure.

Float switch means 110 are also mounted on frame 62 for actuating motor 50 in accordance with fluid level 66. Float switch means 110 includes a float 112 carried on an elongated rod 114 which is vertically movable within a guide tube 116 in accordance with the fluid level 66. Rod 114 carries a pair of stops 118 and 120 adjacent its upper end for engaging switch members 122, 124, and 126.

It is to be understood that the fluid in accumulator 58 is delivered under pressure to braking means 24. When the brakes are energized, the fluid contained within the braking means is then discharged to tank 64 so that the level of the fluid in the tank is inversely in proportion to the amount of fluid in the accumulator.

A relatively high level of fluid 66 in storage tank 64 indicates that there is a reduced amount of fluid in accumulator 58. As the level of fluid in the storage tank rises, it causes float 112 to rise until stop 120 engages switch 126 to cause motor 50 to pump fluid from the storage tank, the fluid level drops until stop 118 engages switch 124 thereby denergizing motor 50.

Should a failure occur in either the pumping means 68 or motor 50, or should accumulator 58 discharge into the storage tank due to a valve leakage or malfunction, the high fluid level in the storage tank 64 will cause float 112 to rise until the upper end of rod 114 engages switch 122 to trip an appropriate warning device 128 to warn the vehicle operator.

Figure 4:
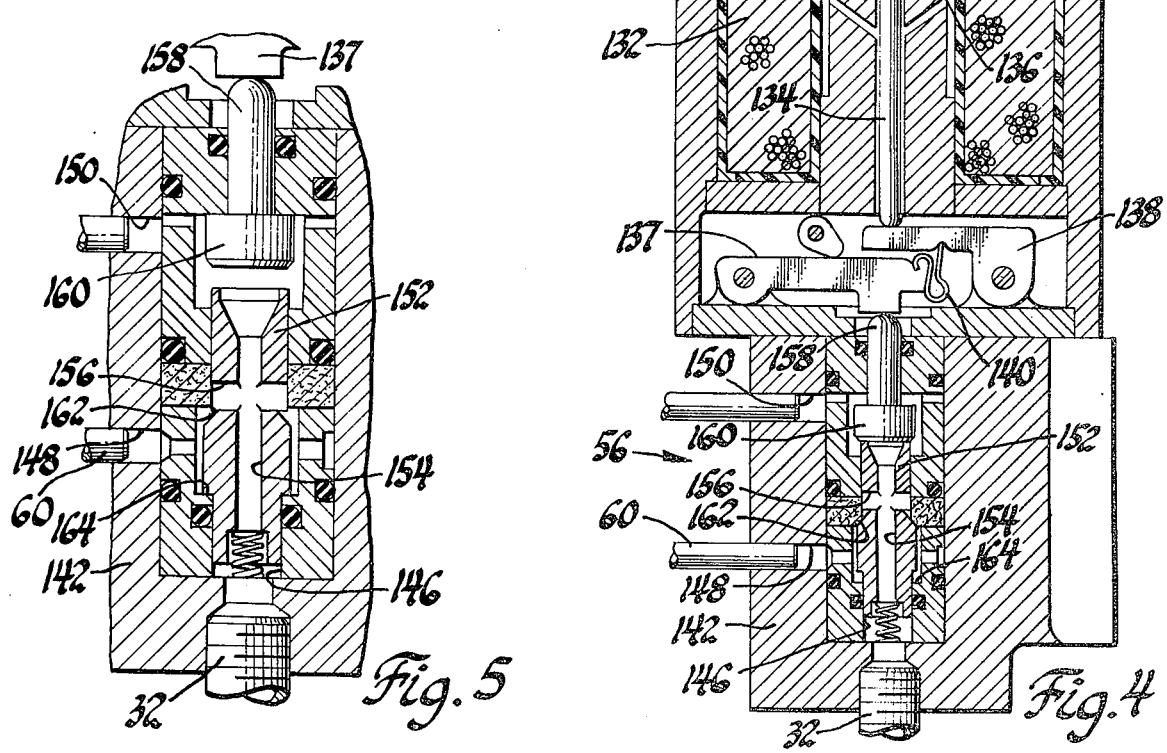
FIG. 4 is a longitudinal sectional view through the solenoid-actuated control valve.

FIG. 4 illustrates a solenoid 54 for energizing and denergizing braking means 24. The solenoid comprises a housing 130 and electrical coil means 132 disposed in the housing and connected by electrical connection 52 to source of electrical energy 40. A piston 134 carries core means 136 within coil means 132. A spring bias member 138 is disposed between a cap 140 mounted on housing 130, and core means 136 to bias piston 134 away from the cap. When coil means 132 is electrically energized, it urges piston 134 away from cap 140. Valve means 56 is actuated according to the motion of piston 134 through a pair of links 137 and 138 connected together by a flexible connection 140.

Figure 5:
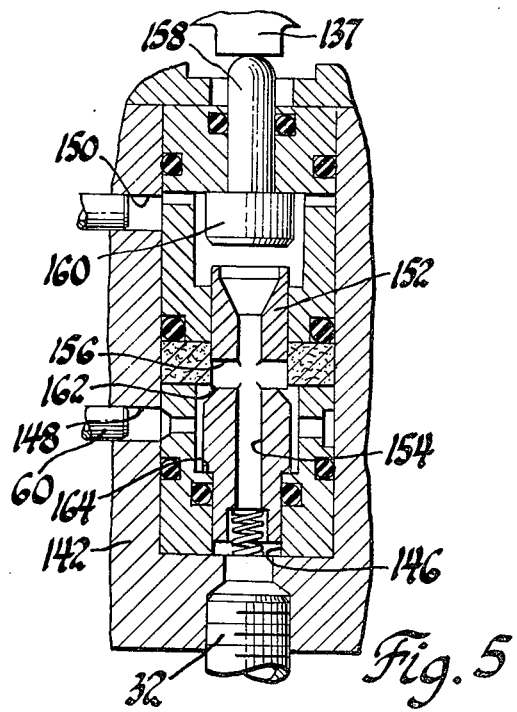
FIG. 5 is another sectional view showing the spool valve in another position with respect to FIG. 4.

Referring to FIGS. 4 and 5, valve means 56 includes a housing means 142 mounted on the lower end of solenoid housing 130. Housing means 142 has an elongated passage 146 having an outlet connected to hydraulic connection 32, an inlet 148 connected to connector 60, and a second outlet 150 connected to storage tank 64.

A spool 152 is slidably mounted in passage 146. Spool 152 is elongated and has a longitudinal passage 154 which extends between opposite ends of the spool, and a radial passage 156 which connects with passage 154. Passage 156 is connected with inlet passage 148 in an appropriate position of the spool, while one end of the passage 154 is connected to outlet 32 and other end of passage 154 is adapted to be connected to outlet 150 in a manner which will be presently described.

A push rod 158 is movably disposed between link 138 and carries a valve seat 160 for engaging the upper end of spool 152.

In the position of metering valve 56 illustrated in FIG. 4, the spool is engaged with a shoulder 162 to block fluid connection between inlet 148 and radial passage 156 so that braking device 24 is denergized. When the operator of tractor 10 moves actuator pedal 33 an appropriate voltage is delivered to coil means 132 to push rod 158 downwardly to move spool 152 toward shoulder 164. As the spool engages shoulder 164, a passage is opened from inlet passage 148 through radial passage 156 to longitudinal passage 154 to energize braking means 24. During this operation, valve 160 blocks any fluid flow from passage 154 to outlet passage 150. The pressure in passage 154, while actuating braking device 24 also imposes a fluid force against valve seat 160. This fluid force acting against valve seat 160 acts against the force imposed by solenoid 132 so that rod 158 moves toward the solenoid until the spool engages valve seat 162 thereby blocking fluid flow from inlet 148 into the spool valve. In this condition, there is a balance between the fluid pressure acting against the solenoid and the electrical solenoid force acting against the spool.

When the operator moves actuator pedal 33 toward a release position, a proportional reduction in voltage occurs on solenoid coil 132 which then permits valve seat 160 to be separated from the spool by the fluid pressure in passage 154 thereby discharging fluid toward storage tank 150 until a new fluid pressure balance is established. As the new fluid pressure balance is established, valve seat 160 then blocks the upper end of spool 152.

If the operator completely releases actuator pedal 33 the pressure in the braking system, which is substantially the same as in spool 152, will open valve seat 160 and discharge the fluid into the storage tank. The amount of pressure acting on the braking system is proportionate to the amount of voltage energizing coils 132 which in turn is proportional to the position of the actuator pedal 33.

Having described my invention, I claim:

1. The combination comprising:

a tractor;

an actuator mounted on the tractor so as to be movable in an actuating motion;

a wheeled trailer connected to the tractor;

braking means mounted on the trailer for engaging a trailer wheel in a braking motion;

hydraulic means including a fluid storage tank, a source of fluid under pressure including an elongated resilient tube having an inlet opening connected to the storage tank for receiving fluid therefrom, an outlet opening, a first valve disposed adjacent the inlet opening of the tube, a second valve disposed at the outlet opening of the tube, the tube being movable to a first position to open the inlet valve and to close the outlet valve to receive fluid from the storage tank and a second position in which the inlet valve is closed and the outlet valve is open;

cam means for moving the resilient tube from said second position to said first position whereby the motion of the resilient tube reduces the volume thereof to pass fluid therefrom through the outlet opening;

a housing having a chamber, an inlet connected to the resilient tube for receiving fluid therefrom, a first outlet connected to the storage tank, and a second outlet connected to the braking means for energizing same;

an elongated spool valve axially slidably mounted in the housing so as to be movable between a first position in which it opens a connection between said source of fluid and the braking means to actuate same, and a second position in which it blocks flow from the source of fluid to the braking means and opens a fluid connection between the storage means and the braking means to deenergize same;

first means biasing the spool valve toward one of said positions;

a solenoid having a piston engaged with the spool valve to urge same toward the other of said positions as the solenoid is being energized; and second means electrically connecting the actuator on the tractor to the solenoid on the trailer for energizing the solenoid in response to an actuating motion on the actuator.

2. A combination as described in claim 1, in which the position of the spool depends upon the electrical voltage energizing the solenoid.

3. A combination as defined in claim 2, including electrical motor means connected to the cam means for moving same, a source of electrical energy, a float disposed in the storage tank as to be movable from a first position toward a second position depending upon the fluid level in the storage tank; first means connected to the source of electrical energy for engaging the float in a first position for energizing the motor, and second means connected to the source of electrical energy for engaging the float in a second position to denergize the motor means.

4. A combination as defined in claim 1, in which the spool valve has an axial opening extending from one end thereof toward the opposite end thereof, and a radial opening connected to the axial opening, one end of the axial opening being suited for passing fluid toward the braking means and the other end being suitable for passing fluid toward the storage tank, and the radial opening being suited for receiving fluid from said source.

5. A combination as defined in claim 4, including a first valve seat in the spool valve housing for blocking flow from the axial opening to the storage means, and a second valve seat in the spool valve housing for blocking flow through the radial opening to the axial opening.

6. The combination comprising:
a tractor;
a wheeled trailer connected to the tractor;
an actuator mounted on the tractor so as to be movable in an actuating motion;
braking means mounted on the trailer for engaging a trailer wheel in a braking motion;
hydraulic means including a source of fluid under pressure, said source including an elongated resilient tube having an inlet for receiving fluid, an outlet, a first valve disposed adjacent the inlet, a second valve disposed at the outlet, the tube having a wall movable to a first position to open the inlet valve and to close the outlet valve for receiving fluid in the tube, and a second position in which the inlet valve is closed and the outlet valve is open;
cam means for moving the wall of the tube from said second position to said first position whereby the motion of the tube wall is operative to pass fluid from the tube through the outlet; and
valve means electrically connected to the actuator so as to be operative to fluidly connect the inlet and the outlet of the tube such that the braking means on the trailer is hydraulically actuated in response to an actuating motion of the actuator on the tractor.

* * * * *